United States Patent
Fuessel (10) Patent No.: US 10,382,310 B2
(45) Date of Patent: Aug. 13, 2019

(54) MEASURING DEVICE AND MEASURING METHOD FOR EFFICIENTLY PROCESSING MEASURING RESULTS

(71) Applicant: Rohde & Schwarz GmbH & Co. KG, Munich (DE)

(72) Inventor: Andreas Fuessel, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 278 days.

(21) Appl. No.: 14/818,267

(22) Filed: Aug. 4, 2015

(65) Prior Publication Data

US 2016/0294668 A1  Oct. 6, 2016

Related U.S. Application Data (60) Provisional application No. 62/141,321, filed on Apr. 1, 2015.

(51) Int. Cl.
*H04L 12/26* (2006.01)
*H04W 24/06* (2009.01)

(52) U.S. Cl.
CPC .......... *H04L 43/50* (2013.01); *H04L 43/045* (2013.01); *H04L 43/0829* (2013.01); *H04W 24/06* (2013.01)

(58) Field of Classification Search
CPC ......... H04L 43/50; H04L 43/18; H04L 1/243; H04L 12/26; H04L 41/145; H04L 41/28; H04L 41/22; H04L 43/065; H04L 63/08; H04L 61/2007; H04L 41/0866; H04L 1/1861; H04L 43/045; H04L 12/24; H04L 41/0631; H04L 5/0055; H04L 5/0053; H04L 5/14; H04L 43/04; H04L 41/00; H04L 41/0686; H04L 43/0829; H04L 41/12; G01R 31/08; G01S 5/0027; H04W 24/10; H04W 24/06; H04W 76/19;
(Continued)

(56) References Cited

U.S. PATENT DOCUMENTS 8,406,141 B1 * 3/2013 Couturier ............... H04L 43/18
                                                   370/241
2005/0132053 A1   6/2005 Michl et al.
(Continued)

FOREIGN PATENT DOCUMENTS

EP   1471819 B1   7/2006
EP   1652340 B1   1/2008

*Primary Examiner* — Hardikkumar D Patel
(74) *Attorney, Agent, or Firm* — Potomac Technology Law, LLC (57) ABSTRACT

A measuring device is provided for performing one or more of a protocol test and a conformance test of a device under test. The measuring device comprises a measuring unit configured to perform measurements by transmitting signaling to the device under test and to receive measurement results from the device under test. The measuring results comprise one or more of messages and numerical values. The measuring device comprises a storage unit configured to store the signaling and the measuring results in a single binary storage file. The measuring device comprises a searching unit configured to search the storage file for at least one first measuring result based on user-selectable criteria and to generate an output file comprising only the at least one first measuring result.

24 Claims, 5 Drawing Sheets

(58) Field of Classification Search
CPC . H04W 36/0005; H04W 76/30; H04W 76/14; H04W 72/0446; H04W 28/04; G06F 11/28; G06F 16/9535; G06F 11/26; G06F 11/079; G06F 11/3414; G06F 11/3476; G06F 11/0748; G06F 11/3006; G06F 16/951; G06F 16/83; H03M 7/3068; H03M 7/607; H03M 7/3079; H04B 7/2615; H04B 17/00; H04B 17/0085; H04B 17/29; H04J 3/22

See application file for complete search history.

(56) References Cited

U.S. PATENT DOCUMENTS

| | | | |
|---|---|---|---|
| 2007/0256067 A1* | 11/2007 | Chahal | G06F 8/63 717/168 |
| 2008/0151760 A1 | 6/2008 | Michl | |
| 2008/0293363 A1* | 11/2008 | Olgaard | H04B 17/0085 455/67.7 |
| 2014/0101485 A1* | 4/2014 | Wegener | H03M 7/3068 714/32 |
| 2014/0269386 A1* | 9/2014 | Chu | H04L 41/145 370/252 |
| 2014/0357298 A1* | 12/2014 | Koskinen | G01S 5/0027 455/456.1 |
| 2015/0149834 A1* | 5/2015 | Raddino | H04L 43/18 714/46 |
| 2016/0050572 A1* | 2/2016 | Merkel | H04W 76/14 455/426.1 |
| 2016/0110359 A1* | 4/2016 | Underwood | G06F 11/3476 707/643 |

\* cited by examiner

MEASURING DEVICE AND MEASURING METHOD FOR EFFICIENTLY PROCESSING MEASURING RESULTS

RELATED APPLICATIONS

This application claims the benefit of the earlier filing date under 35 U.S.C. § 119(e) of U.S. Provisional Application Ser. No. 62/141,321 (filed Apr. 1, 2015).

TECHNICAL FIELD

The invention relates to performing tests, such as protocol tests or conformance tests of mobile communications devices with very large numbers of individual measurements.

BACKGROUND

For performing conformance tests, the abstract specification (e.g., procedures and parameters) of the tests is usually provided in the TTCN format. These procedures and parameters specify how exactly the conformance tests are to be performed. Especially, the procedures and parameters specify which message responses are expected for the device under test to pass the conformance test. Since these abstract specifications in TTCN are used by different measuring devices, such as system simulators or protocol testers, from different measuring device manufacturers, they are not specific to a single measuring device. In order to generate test cases for a specific measuring device, the abstract TTCN instructions are compiled into runtime code, which is linked against the measuring device specific adaptor runtime code into an executable so that it could run on the target measuring device. The adapter maps the abstractly defined communication to real communication channels.

Based thereupon, the measuring device is set up and generates signaling, which is transmitted to the device under test. The device under test receives the signaling and answers with respective messages. These messages are received by the device under test and stored. So far, it is customary to store the signaling and the messages received from the device under test separately. Especially, it is customary to store the received messages in one large XML-file. In case of conformance tests involving a large number of measurement results, this one large XML-file is very difficult to process. Also, in case of very lengthy test procedures, storing the measurement results in the one large XML-file results in a very high risk of losing the measurement results in case of a system crash, as XML-files are usually stored at the end of the test case and not during test execution to avoid disk operations due to possible performance limitations of the system.

For example, the European Patents EP 1 472 819 B1 and EP 1 652 340 B1 shows a method for receiving and analyzing messages from a device under test. The document though does not show an efficient way of storing and sorting the according messages.

What is needed, therefore, are approaches for a measuring device and associated measuring methods that facilitate efficient storage and sorting of measurement results.

SUMMARY

Embodiments of the present invention advantageously address the foregoing requirements and needs, as well as others, by providing approaches for a measuring device and associated measuring methods that facilitate efficient storage and sorting of measurement results.

According to a first embodiment of the present invention, a measuring device or testing device is provided that is configured for performing a conformance test of a device under test. The measuring device comprises a measuring unit configured to perform measurements by transmitting signaling to the device under test and receiving measurement results from the device under test. The measurement results are either messages and/or numerical values. By way of example, the measuring device comprises a storage unit, which is configured to store the signaling and the measurement results in a single binary storage file. The measuring device further comprises a searching unit configured to search the storage file for at least one first measurement result based on user-selectable criteria and to generate an output file comprising only the at least one first measurement result. By storing the signaling and the measurement results in a single binary storage file via a log server, data loss in case of a test case crash is prevented by the log server already obtaining all results until the crash. Also, by performing a first search of the binary storage file, reducing the amount of data, an efficient further processing is possible.

According to a further embodiment, the storage unit is configured to store operation and/or status information of the protocol test or conformance test in the single binary storage file. In this case, advantageously, the operations are send/receive operations and/or test steps and/or function calls and/or procedure calls and/or variable assignments and/or verdict assignments and/or timer operations and/or encoding/decoding operations and/or component handling operations. Also in this case the status information advantageously is behavior status information and/or progress status information. It is thereby possible to include a very broad variety of further content in the single binary storage file.

According to a further embodiment, the measuring unit is configured to perform parallel test procedures/measurements using at least one communications standard on the device under test. The communication standard(s) can be LTE, WCDMA, GERAN, TDSCDMA, EVDO, POS and/or WIFI. Also other communications standards can be used. In this embodiment, the storage unit is further configured to store the signaling and the measurement results of the parallel test procedures/measurements in the single binary storage file. Extensively flexible measuring operations are thereby possible. Also, by storing the signaling and measurement results of the parallel test procedures/measurements in one single binary storage file, a further increase in processing efficiency is achieved. Accordingly, two or more different of the above-mentioned communications standards can be used in parallel.

According to a further embodiment, the storage unit is configured to store the signaling and the measurement results successively in an order of occurrence in the storage file. An especially efficient storage processing is thereby possible. Also, the amount of data loss in case of a system crash is minimized, since the data is stored as soon as it is available.

According to a further embodiment, the storage unit is configured to write each individual signaling to the storage file at a moment of transmission and write each individual measurement result to the storage file at a moment of measurement. A further decrease in data loss in case of a system crash can thereby be achieved.

According to a further embodiment, the storage unit is configured to store each of the measurement results as an individual XML-section within the storage file. Further, the searching unit may be thus configured to search the storage file for at least one individual XML-section of the at least one first measurement result based on the user-selectable criteria. Also, the searching unit may be configured to generate the output file as a single XML-file from the searched for at least one individual XML-section. The individual XML-sections of the first measurement results are thereby combined into a single XML-file, which provides an efficient format for the output file comprising only the data that is actually needed.

According to a further embodiment, the storage unit is configured to store each of the measurement results including a header within the storage file. The header comprises an abstract service primitive and/or information regarding a transmission protocol used by the device under test and/or information regarding a protocol layer of the measurement result. Also, further information can be stored in the header. Further, the searching unit may thus be configured to search the storage file for the at least one first measurement result by searching the headers of the measurement results within the storage file for the user selectable criteria, which provides for an especially efficient search capability.

According to a further embodiment, the measuring device further comprises an analyzing unit and a display unit. The analyzing unit is configured to read the output file and search the output file for second measurement results based on further user-selectable criteria. Also, the display unit is configured to display the second measurement results. Since the output file comprises only a significantly reduced amount of data, searching the output file requires only a low computational complexity. It is thereby possible to display the searched for measurement results in a simple and efficient manner.

According to a second embodiment of the invention, a measuring method is provided for performing a conformance test of a device under test of a device under test. The method comprises performing measurements by transmitting signaling to the device under test and receiving measurement results from the device under test. The measurement results comprise messages and/or numerical values. The signaling and the measurement results are stored in a single binary storage file. The storage file may be searched for at least one first measurement result based on user-selectable criteria. An output file is generated comprising only the at least one first measurement result. By storing the signaling and the measurement results in a single binary storage file via an log server, data loss in case of a test case crash is prevented by the log server already obtaining all results until the crash. Also, by performing a first search of the binary storage file, reducing the amount of data, efficient further processing is possible.

According to a third aspect of the invention, a computer program with a program code is provided for performing the method of the second embodiment when a computer runs the computer program.

BRIEF DESCRIPTION OF THE DRAWINGS

Example embodiments of the present invention are described herein in further detail with reference to the following Figures, which illustrate such embodiments by way of example and not by way of any limitation, and in which like reference numerals refer to similar elements. In the drawings.

DETAILED DESCRIPTION

Figure 1:
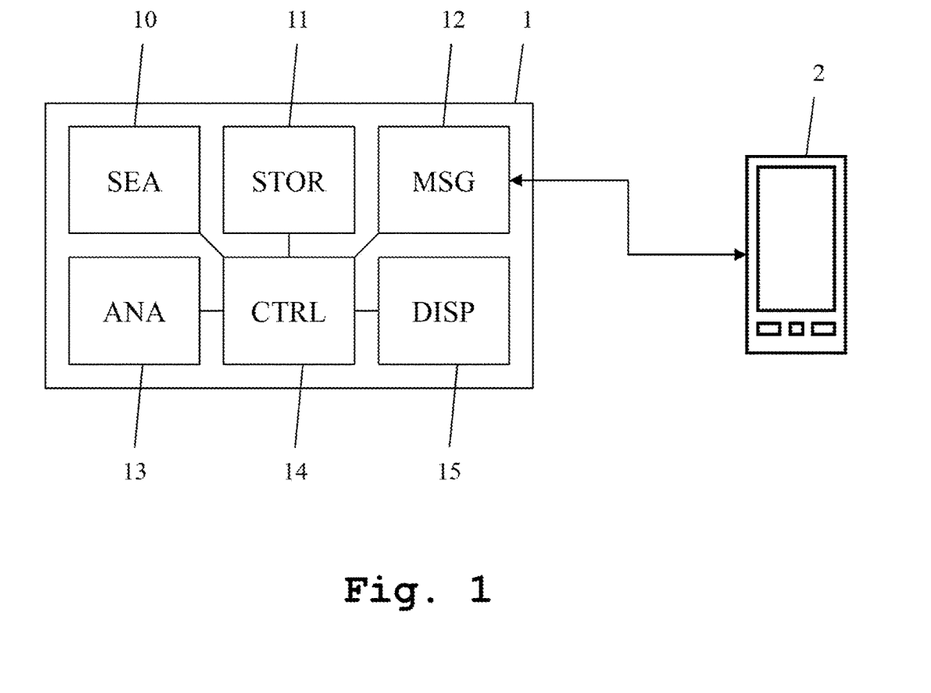
FIG. 1 shows a block diagram of a measuring device, in accordance with example embodiments of the present invention.

In the following description, problems of present approaches, which are addressed by example embodiments of the present invention, are first demonstrated. With reference to FIG. 1, approaches for the configuration and operation of a measuring device are then described in accordance with example embodiments of the present invention. Then, with reference to FIGS. 2-4, further details of the operation of the measuring device approaches are described in accordance with example embodiments of the present invention. Additionally, with reference to FIG. 5, approaches for a measuring method are described in accordance with example embodiments of the present invention.

Reference will now be made in detail to example embodiments of the present invention, examples of which are illustrated in the accompanying drawings. The following embodiments of the present invention may be variously modified and the range of the present invention is not limited by the following embodiments.

An example XML-document storing measurement results is as follows:

```
<?xml version="1.0"?>
<!-- XML TLI log generated by Rohde & Schwarz LTE protocol test casase-->
<logfile xmlns="http://uri.etsi.org/ttcn-3/tci/TLI_v4_6_1.xsd"
    xmlmlns:e0="http://uri.etsi.org/ttcn-3/tci/Events_v4_6_1.xsd"
xmlns:s0="http://uri.etsi.org/ttcn-3/tci/SimpleTypes_v4_6_1.xsd"
    xmlns:t0="http://uri.etsi.org/ttcn-3/tci/Types_v4_6_1.xsd"
xmlns:t1="http://uri.etsi.org/ttcn-3/tci/Templates_v4_6_1.xsd"
    xmlmlns:v0="http://uri.etsi.org/ttcn-3/tci/Values_v4_6_1.xsd"
xmlns:xsi="http://www.w3.org/2001/XMLSchema-instance"
    xsi:schemaLocation="http://uri.etsi.org/ttcn-3/tci/TLI_v4_6_1.
    xsd">
  <header>
    <version>4.1p3 2015-01-28 15:19:50</version>
    <ts>20150317175132</ts>
  </header>
  <body>
    <tliModuleParts="20150317175132" src="./PicsPixit/Parameters.s.
    ttcn" line="847"
        name="InitGlobalValueDefs" id="" type="">
      <e0:am/>
      <e0:name moduleName="Parameters" baseName=
      "pc_TDD_LCR"/>
      <e0:val>
        <v0:boolean>
          <v0:value>false</v0:value>
        </v0:boolean>
      </e0:val>
    </tliModulePar>
    <tliModulePar ts="20150317175133"
        src="./PicsPixit/IMS_CommonPnParameters.ttcn"
        line="83"
        name="InitGlobalValueDefs" id="" type=""
      <e0:am/>
      <e0:name moduleName="IMS_CommonParameters"
          baseName="pc_IMS_S_Deregistration"/>
      <e0:val>
```

```
        <v0:boolean>
            <v0:value>false</v0:value>
        </v0:boolean>
      </e0:val>
    </tliModulePar>
  </body>
</logfile>
```

Accordingly, it is evident that, for storing only two different parameters, an entire page of XML-source code is needed. This is disadvantageous, since especially in tests with a great number of parameters to be measured and messages to be received, this leads to an extremely long XML-file comprising the measurement results.

Such is also evident where only a structural overview of an XML-document body is shown, as follows:

```
<body>
    <tliTcExecute/>
    <tliTcStart/>
    <tliTcStop/>
    <tliTcStarted/>
    <tliTcTerminated/>
    <tliMSend_m/>
    <tliMSend_c/>
    <tliMDetected_m/>
    <tliMDetected_c/>
    <tliMMismatch_m/>
    <tliMMismatch_c/>
    <tliMReceive_m/>
    <tliMReceive_c/>
    <tliEncode/>
    <tliDecode/>
    <tliTTimeoutDetected/>
    <tliTTimeoutMismatch/>
    <tliTTimeout/>
    <tliTStart/>
    <tliTStop/>
    <tliTRead/>
    <tliTRunning/>
    <tliSEnter/>
    <tliSLeave/>
    <tliVar/>
    <tliModulePar/>
    <tliGetVerdict/>
    <tliSetVerdict/>
    <tliLog/>
<body>
```

Here, each single line represents an entire segment of the XML-document, which is needed for storing a single parameter. It is obvious, that in real world test cases, which easily comprise thousands of measurement results or even significantly more, handling the measurement results in a single XML-document poses to be very difficult if not impossible.

FIG. 1 shows a block diagram of a measuring device, in accordance with example embodiments of the present invention. According to such example embodiments, the measuring device 1 comprises a searching unit 10, a storage unit 11, a measuring unit 12, an analyzing unit 13, a control unit 14 and a display unit 15. The search unit 10, the storage unit 11, the measuring unit 12, the analyzing unit 13 and the display unit 15 are each connected to the control unit 14. The control unit 14 controls the functions of each of the other units 10-12, 13 and 15. Moreover, the measuring unit 12 is connected to a device under test 2, in this example a mobile telephone.

According to one embodiment, for performing a test, test procedures and parameters are provided to the control unit 14, for example by a measuring device adapter, which is fed from TTCN generated runtime code executables. The control unit 14 sets up the measurement based upon these procedures and parameters. The control unit 14 controls the measuring unit 12 to transmit a signaling to the device under test 2. The device under test 2 receives the signaling and responds by emitting signals itself. These signals usually are messages, which are again received by the measuring unit 12. The measuring unit 12 optionally further processes these messages and determines numerical values as measurement results. Alternatively, the received messages are the measurement results directly. The measurement results are then handed on to the control unit 14, which stores them in the storage unit 11. The storage unit stores the measurement results along with the respective signaling in a single binary storage file.

According to a further embodiment, in addition to the signaling and measurement results, also operations and/or status information of the protocol test or conformance test can be stored in the single binary storage file. The operations can be send/receive operations and/or test steps and/or function calls and/or procedure calls and/or variable assignments and/or verdict assignments and/or timer operations and/or encoding/decoding operations and/or component handling operations. The status information can be behavior status information and/or progress status information.

By way of example, advantageously, the signaling and the measurement results, and all other pieces of information stored in the binary storage file, are stored in the moment they come into existence. This leads to a high security of the information in case of a system failure. Since the signaling, measurement results and other information are stored in a single storage file jointly, it is very easy to discern the relationship between the signaling and the measurement results. Further, the measurement results are advantageously stored as XML-segments within the storage file. Each of the individual XML-segments is separate from the other XML-segments and constitutes a complete XML-block on its own. This means that if only a part of the XML-segments can be recovered after a system crash, the intact XML-segments can still be read and further processed. Each of these XML-segments is stored by the storage unit including a header, which comprises information regarding the content of the respective XML-segment. Further, the header can store an abstract service primitive and/or information regarding a transmission protocol used by the device under test and/or information regarding a protocol layer of the measurement result.

According to a further embodiment, in order to view the stored data, a user can select a number of criteria, by which the measurement results are to be sorted. The searching unit 10 is configured to search the storage file within the storage unit 11 for at least one first measurement result or more first measurement results based on the user-selected criteria. Further, when searching for the first measurement results, the searching unit searches through the headers of the XML-segments for the user-selected criteria. Also a search regarding operations or status information or any other piece of information stored in the single binary storage file is possible. The searching unit 10 then creates an output file comprising only the first measurement results. The output file is therefore significantly smaller than the storage file. This significantly reduces the computational complexity of further processing of the measurement results.

Further, when generating the output file, the XML-segments of the first measurement results are combined into a single large XML-file, which is the output file. Since the output XML-file only comprises a significantly reduced number of measurement results, the low efficiency of working with XML-documents is no longer a problem.

According to a further embodiment, the output file is then processed by the analyzing unit 13, which reads the output file and again searches the output file for user-selectable criteria. Since the output file only comprises a subset of the measurement results of the storage file, performing a further search on the output file is still a quick operation, although the output file is optionally stored as a single large XML-file. The resulting second measurement results are then handed to the display unit 15, which displays them in a user-readable format.

According to a further embodiment, the measuring device 1 is configured to handle separate different parallel test components, such as parallel processes, at the same time. In this case, the signaling transmitted to the device under test 2 by the measuring unit 12 instructs the device under test 2 to operate two or more processes simultaneously, employing, for example multiple communications standards. Such communications standards can comprise for example LTE, WCDMA, GERAN, TDSCDMA, EVDO, POS and WIFI. Also other communications standards are possible. In this case, the storage unit 11 stores the signaling and the measurement results of the different communications standards all within the same single binary storage file. Optionally, the storage is handled on a real-time-basis, meaning that each piece of information be it signaling or measurement results is stored within the binary storage file as it occurs. Optionally, the parallel processes can comprises different communications standards.

Figure 2:
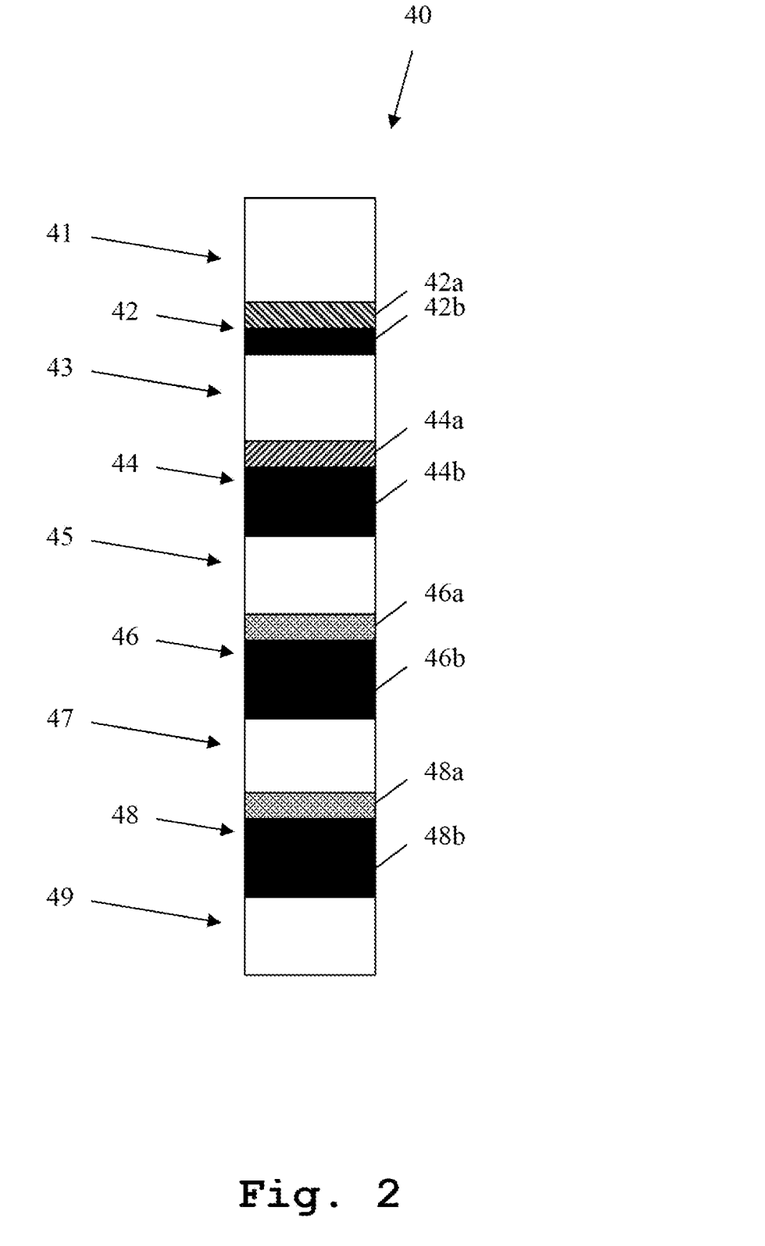
FIG. 2 shows a binary file, in accordance with example embodiments of the present invention.

FIG. 2 shows a binary file 40, in accordance with example embodiments. The storage file 40 comprises a number of signaling blocks 41, 43, 45, 47 and 49 and a number of measurement results 42, 44, 46 and 48. The measurement results 42, 44, 46 and 48 each comprise a header 42a, 44a, 46a and 48a and an XML-segment 42b, 44b, 46b and 48b. The individual blocks 41-49 are stored within the storage file 40 as they occur successively.

Figure 3:
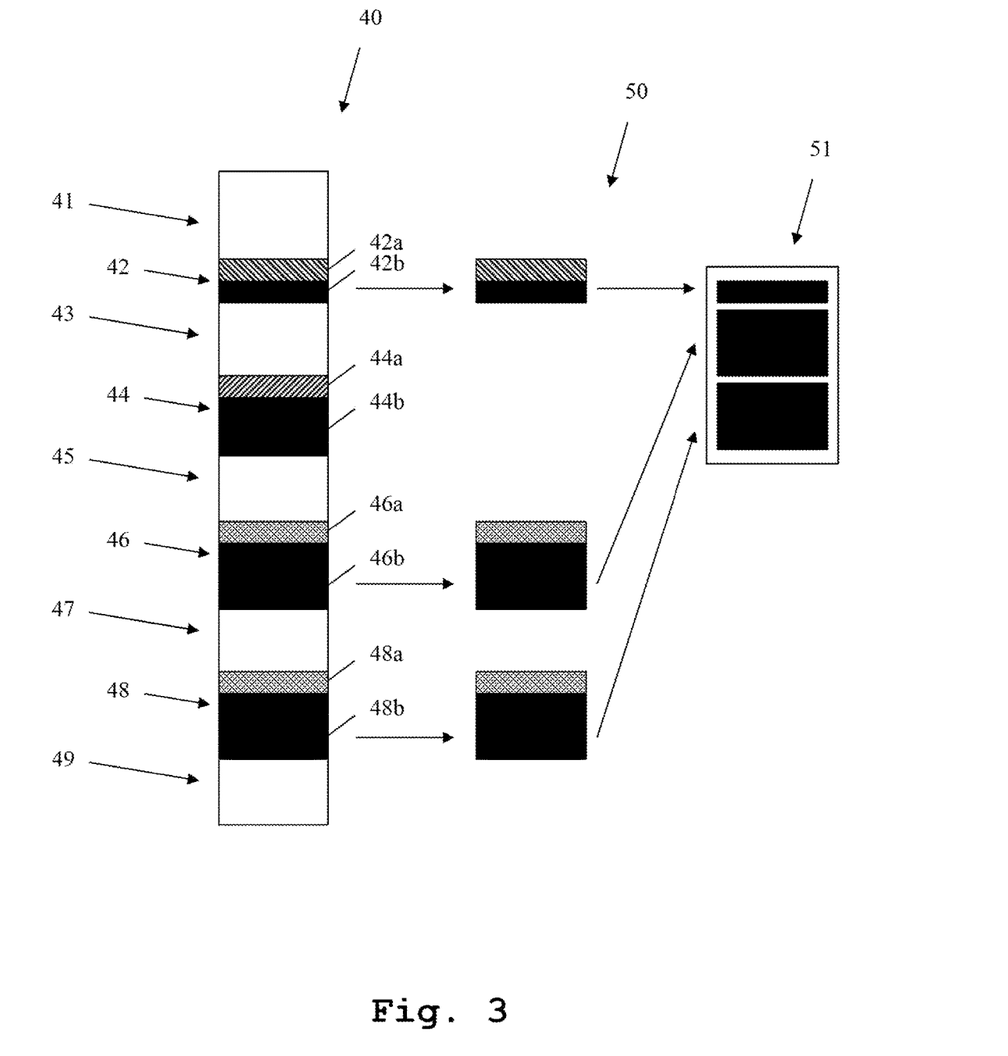
FIG. 3 shows an example binary file and further processing of the binary file, in accordance with example embodiments of the present invention.

FIG. 3 shows an example binary file and further processing of the binary file 40, in accordance with example embodiments. In a first step, the searching unit 10 of FIG. 1 searches for first measurement results 50 based upon the information within the headers 42a, 44a, 46a and 48a. In this example, the measurement results 42, 46 and 48 have been selected as first measurement results 50. They are then combined into a single output file 51. Now, only the content of the XML-sections 42b, 46b and 48b is used. The headers 42a, 46a and 48a are discarded. The information from the XML-segments 42b, 46b and 48b is combined so that it forms a single XML-file. Although in the figure, the output file 51 still comprises three separate blocks, this merely signifies that the information from all three XML-segments 42b, 46b and 48b is part of the output file 51. Accordingly, it does not signify that the XML-segments 42b, 46b and 48b are stored within the output file 51 separately, but rather are combined into a single XML-document which serves as output file 51. Further, the headers and body are stored in the beginning and then sequentially log events, especially XML sections are stored separates from the header/body. They can be assembled therefrom later.

Figure 4:
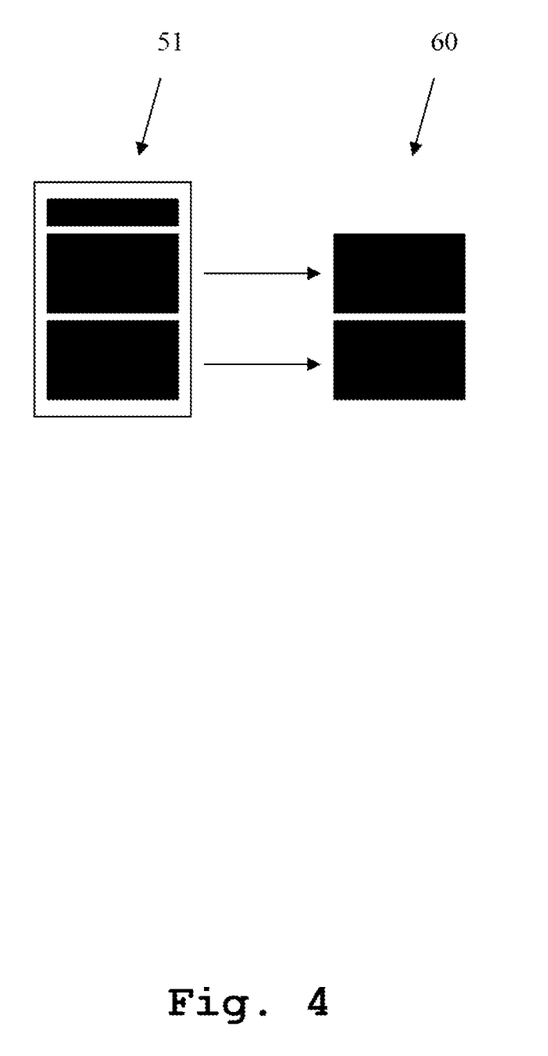
FIG. 4 shows further processing of measurement results, in accordance with example embodiments of the present invention.

FIG. 4 shows further processing of measurement results of the output file 51, in accordance with example embodiments. A second search is performed by the analyzing unit 13 of FIG. 1. This second search is performed based upon further user-selected criteria and in this example leads to second measurement results 60, which are afterwards displayed by the display unit.

Figure 5:
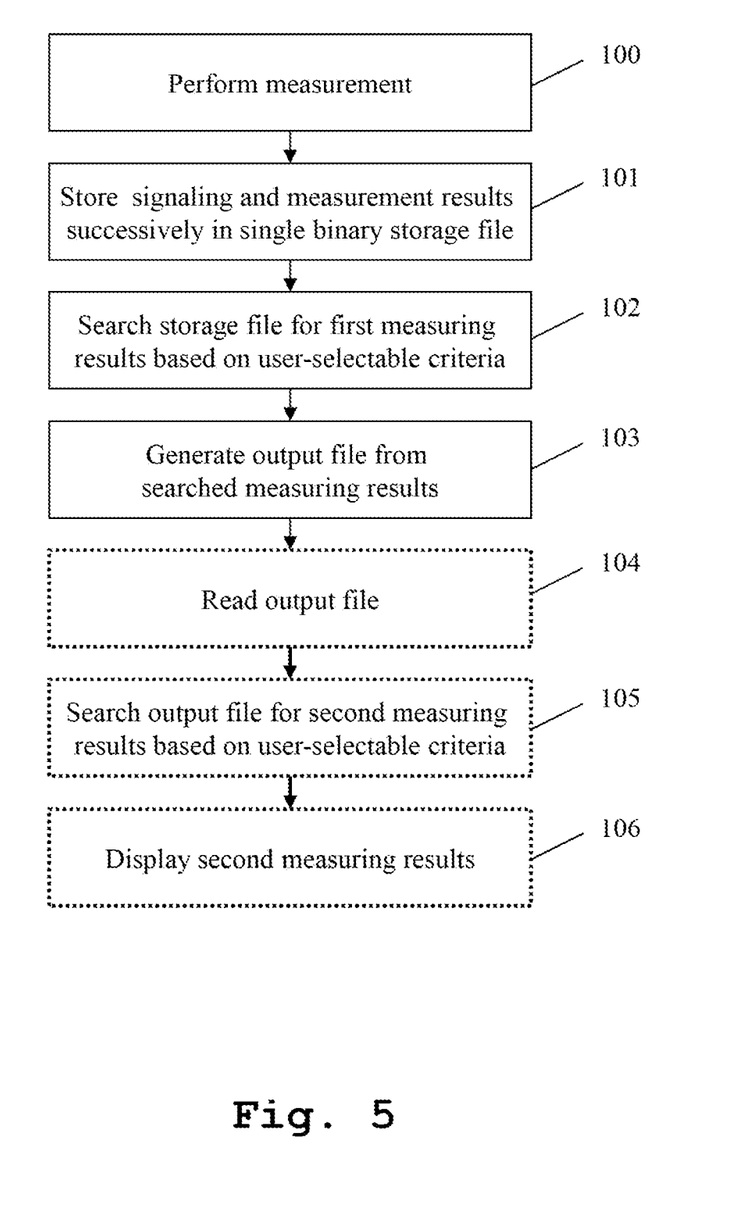
FIG. 5 shows a flow diagram of a measuring method, in accordance with example embodiments of the present invention.

FIG. 5 shows a flow diagram of a measuring method, in accordance with example embodiments. In a first step 100, measurements are performed on the device under test. This includes transmitting signaling to the device under test and receiving messages. The messages can directly be the measurement results or can be further processed to derive numerical values as measurement results.

In a second step 101, the signaling and the measurement results are stored in a single binary storage file. In addition to the signaling and measurement results, operations and/or status information of the protocol test or conformance test can be stored in the single binary storage file. The operations can be send/receive operations and/or test steps and/or function calls and/or procedure calls and/or variable assignments and/or verdict assignments and/or timer operations and/or encoding/decoding operations and/or component handling operations. The status information can be behavior status information and/or progress status information. Advantageously, the different pieces of information are stored successively at the moment of occurrence.

In a third step 102, the storage file is searched for first measurement results based on user-selectable criteria. The resulting first measurement results are combined in an output file in a fourth step 103. Also, a search for other pieces of information stored in the binary storage file is possible. In an optional step 104, this output file is again read. In a sixth step 105, the output file is searched for second measurement results based upon further user-selectable criteria. In a final seventh step 106, these second measurement results are displayed.

The embodiments of the present invention can be implemented by hardware, software, or any combination thereof. Various embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

Various embodiments of the present invention may also be implemented in the form of software modules, processes, functions, or the like which perform the features or operations described above. Software code can be stored in a memory unit so that it can be executed by a processor. The memory unit may be located inside or outside the processor and can communicate date with the processor through a variety of known means.

The invention is not limited to the examples and especially not to a measuring device as shown. It can also be used in measuring systems comprising more than one device under test. Also it can be used with network analyzers or spectrum analyzers. Furthermore the device under test need not be a mobile telephone. The characteristics of the example embodiments can be used in any combination.

Although the present invention and its advantages have been described in detail, it should be understood, that various changes, substitutions and alterations can be made herein without departing from the spirit and scope of the invention as defined by the appended claims.

What is claimed is:

1. An apparatus for performing one or more of a protocol test and a conformance test of a device under test, the apparatus comprising:
   one or more processors, a memory and a measuring device; and
   wherein the one or more processors is/are configured to control the measuring device to perform measurements of the device under test, for the one or more of the protocol test and the conformance test, by generating and transmitting one or more signaling messages to the device under test and receiving responsive measurement results from the device under test, wherein the measurement results comprise one or more messages;

wherein the one or more processors is/are configured to control the memory to store the signaling messages and the measurement results in a single binary storage file, wherein the signaling messages and the measurement results are each stored in the single binary storage file at a time that the signaling messages and the measurement results respectively come into existence;

wherein the signaling messages and the measurement results are stored in the single binary storage file via a log server, where the log server prevents data loss in the event of a test case crash;

wherein the one or more processors is/are further configured to search the single binary storage file for at least one first measurement result based on at least one first user-selectable criteria, and to generate an output file comprising only the at least one first measurement result, and wherein the one or more processors is/are further configured to control the memory to store one or more of operations and status information, relating to the one or more of the protocol test and the conformance test, in the single binary storage file.

2. The apparatus according to claim 1, wherein the measurement results comprise numerical values.

3. The apparatus according to claim 1, wherein the operations comprise one or more of send operations, receive operations, test steps, function calls, procedure calls, variable assignments, verdict assignments, timer operations, encoding operations, decoding operations, and component handling operations.

4. The apparatus according to claim 1, wherein the status information comprises one or more of behavior status information and progress status information.

5. The apparatus according to claim 1, wherein:
the measurements comprise parallel measurements of the device under test employing one or more different communications standards; and
the one or more processors is/are configured to control the memory to store the one or more signaling messages for the parallel measurements and the measurement results of the parallel measurements in the single binary storage file.

6. The apparatus according to claim 5, wherein the one or more different communications standards comprise one or more of Long Term Evolution (LTE), Wideband Code Division Multiple Access (WCDMA), Global System for Mobile Communications (GSM) Enhanced Data Rates for GSM Evolution (EDGE) Radio Access Network (GERAN), Time-division-Code-division Multiple Access (TD-SCDMA), Evolution-Data-Optimized (EVDO), Point of Sale (POS), and WiFi.

7. The apparatus according to claim 1, wherein the one or more processors is/are further configured to control the memory to store the one or more signaling messages and the measurement results successively in an order of occurrence in the single binary storage file.

8. The apparatus according to claim 1, wherein the one or more processors is/are further configured to control the memory to store each message of the one or more signaling messages in the single binary storage file at a respective time of transmission, and to store each of the measurement results in the single binary storage file at a respective time of receipt.

9. The apparatus according to claim 1, wherein:
the one or more processors is/are further configured to control the memory to store each of the measurement results as an individual eXtensible Markup Language (XML) section within the single binary storage file; and
the one or more processors is/are further configured to search the single binary storage file for the respective individual XML section or sections of the at least one first measurement result based on the at least one first user-selectable criteria, and to generate the output file as a single XML file based on the respective individual XML section or sections of the at least one first measurement result.

10. The apparatus according to claim 1, wherein:
the one or more processors is/are further configured to control the memory to store each of the measurement results including a header within the single binary storage file, wherein the header comprises one or more of an abstract service primitive, information regarding a transmission protocol used by the device under test, and information regarding a protocol layer of the measurement result; and
the one or more processors is/are further configured to search the single binary storage file for the at least one first measurement result by searching the headers of the measurement results within the single binary storage file.

11. The apparatus according to claim 1, wherein:
the one or more processors is/are further configured to search the output file for at least one second measurement result based on at least one second user-selectable criteria; and
the apparatus further comprises a display configured to display the at least one second measurement result.

12. The apparatus according to claim 11, wherein:
the one or more processors is/are further configured to search the single binary storage file for at least one of the one or more signaling messages based on the at least one second user-selectable criteria; and
the display is further configured to display the searched for at least one signaling message with the second measurement results.

13. A method for performing one or more of a protocol test and a conformance test of a device under test, the method comprising:
performing measurements of the device under test, for the one or more of the protocol test and the conformance test, by a measuring device, by generating and transmitting one or more signaling messages to the device under test and receiving responsive measurement results from the device under test, wherein the measurement results comprise one or more messages;
storing the one or more signaling messages and the measurement results in a single binary storage file in a memory device, wherein the signaling messages and the measurement results are each stored in the single binary storage file at a time that the signaling messages and the measurement results respectively come into existence, wherein the signaling messages and the measurement results are stored in the single binary storage file via a log server, where the log server prevents data loss in the event of a test case crash;

searching, by one or more processors, the single binary storage file for at least one first measurement result based on at least one first user-selectable criteria; and generating, by the one or more processors, an output file comprising only the at least one first measurement result; and wherein one or more of operations and status information, relating to the one or more of the protocol test and the conformance test, are stored in the single binary storage file.

14. The method according to claim 13, wherein the operations comprise one or more of send operations, receive operations, test steps, function calls, procedure calls, variable assignments, verdict assignments, timer operations, encoding operations, decoding operations, and component handling operations.

15. The method according to claim 13, wherein the status information comprises one or more of behavior status information and progress status information.

16. The method according to claim 13, wherein the measurement results comprise numerical values.

17. The method according to claim 13, wherein:
the performed measurements comprise parallel measurements of the device under test employing one or more different communications standards; and
the one or more signaling messages for the parallel measurements and the measurement results of the parallel measurements are stored in the single binary storage file.

18. The method according to claim 17, wherein the one or more different communications standards include one or more of Long Term Evolution (LTE), Wideband Code Division Multiple Access (WCDMA), Global System for Mobile Communications (GSM) Enhanced Data Rates for GSM Evolution (EDGE) Radio Access Network (GERAN), Time-division-Code-division Multiple Access (TD-SCDMA), Evolution-Data-Optimized (EVDO), Point of Sale (POS), and WiFi.

19. The method according to claim 13, wherein the one or more signaling messages and the measurement results are stored successively in an order of occurrence in the single binary storage file.

20. The method according to claim 13, wherein each of the one or more signaling messages is stored in the single binary storage file at a respective time of transmission, and each measurement result is stored in the single binary storage file at a respective time of receipt.

21. The method according to claim 13, wherein:
each of the measurement results is stored as an individual eXtensible Markup Language (XML) section within the single binary storage file;
the searching of the single binary storage file comprises searching for the individual XML section or sections of the at least one first measurement result based on the at least one first user-selectable criteria, and
the output file is generated as a single XML file based on the respective individual XML section or sections of the at least one first measurement result.

22. The method according to claim 13, wherein:
each of the measurement results is stored within the single binary storage file including a header, wherein the header comprises one or more of an abstract service primitive, information regarding a transmission protocol used by the device under test, and information regarding a protocol layer of the measuring result; and
the searching of the single binary storage file for the at least one first measurement result comprises searching the headers of the measurement results within the single binary storage file.

23. The method according to claim 13, further comprising:
searching, by the one or more processors, the output file for at least one second measurement result based on at least one second user-selectable criteria; and
displaying the at least one second measurement result on a display device.

24. The method according to claim 22, further comprising:
searching, by the one or more processors, the single binary storage file for at least one of the one or more signaling messages based on the at least one second user-selectable criteria; and
displaying the searched for at least one signaling message with the second measurement results on the display device.

* * * * *

UNITED STATES PATENT AND TRADEMARK OFFICE
CERTIFICATE OF CORRECTION

PATENT NO. : 10,382,310 B2
APPLICATION NO. : 14/818267
DATED : August 13, 2019
INVENTOR(S) : Andreas Fussel Page 1 of 1

It is certified that error appears in the above-identified patent and that said Letters Patent is hereby corrected as shown below:

On the Title Page

Item [72], should read as -- Andreas Fussel, Munich (DE) --

Signed and Sealed this
Twenty-sixth Day of May, 2020

Andrei Iancu
*Director of the United States Patent and Trademark Office*